April 22, 1930.  G. I. BOLES  1,755,807
LOCK NUT
Filed April 6, 1929
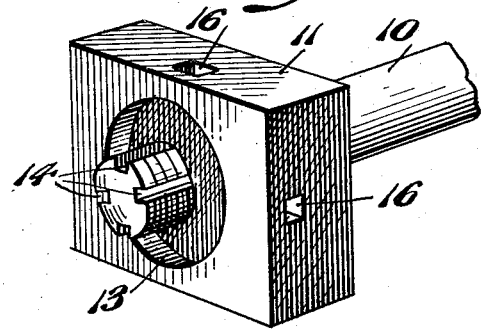
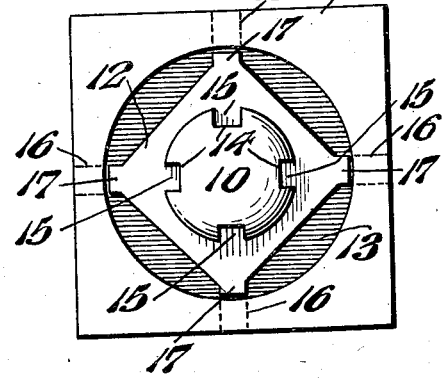
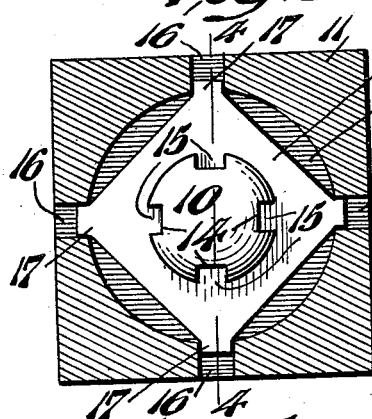
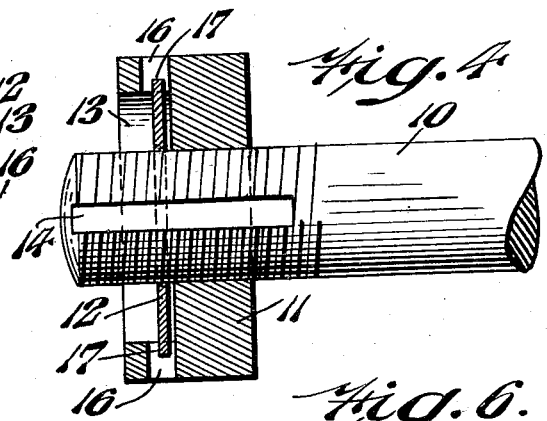
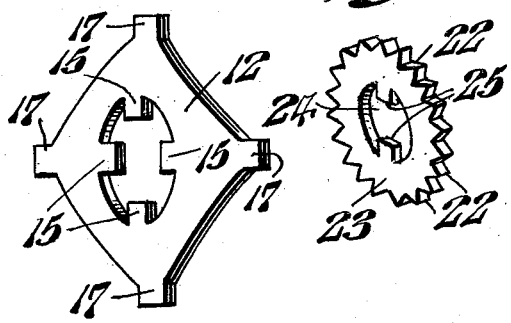
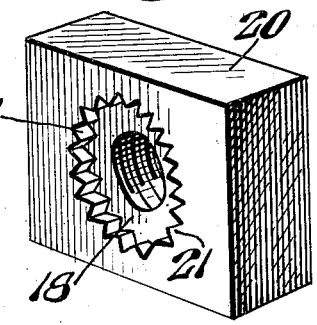
INVENTOR.
George I. Boles,
BY Robert M. Barr.
ATTORNEY Patented Apr. 22, 1930

1,755,807

UNITED STATES PATENT OFFICE

GEORGE I. BOLES, OF WAYNE, PENNSYLVANIA

LOCK NUT

Application filed April 6, 1929. Serial No. 352,982.

The present invention relates to bolts and more particularly to a means for locking a nut on a bolt.

In lock nut devices as heretofore proposed many impractical constructions have been devised and many such constructions have disadvantages which render the successful operation of the device impossible. In some instances lock nut means have been devised wherein supplemental members cooperate between the nut and bolt with a view to preventing rotation of the latter but have no provision for allowing the nut to make full use of the entire length of the threaded portion of the bolt. Again the interlocking means between the nut and bolt is such that a turning force can readily cause the locking part to twist and follow the movement of the nut, thus defeating the very purpose for which it was intended. Again in some forms of locking devices the nut can only be locked after a full turn upon the shank of the bolt and hence it is not always possible to tighten the bolt and at the same time secure a locking of the nut.

Some of the objects of the present invention are to provide a practical and efficient device for locking a nut on a bolt; to provide a nut lock which will permit the nut to be locked in any one of a number of positions less than a complete revolution of the nut; to provide a locking device which is so arranged and constructed as to give a maximum resistance to turning of the nut upon the shank of the bolt; to provide a nut lock in which the locking element can be readily removed when necessary; and to provide other improvements as will hereinafter appear.

In the accompanying drawings Fig. 1 represents a perspective of a bolt and nut equipped with a nut lock embodying one form of the present invention; Fig. 2 represents an end elevation of the bolt and nut showing the locking element in its initial position; Fig. 3 represents a sectional elevation showing the locking element in locked position; Fig. 4 represents a sectional detail on line 4—4 of Fig. 3; Fig. 5 represents a perspective of the locking element; Fig. 6 represents a perspective of a nut showing a modified locking construction; and Fig. 7 represents a perspective of the locking element used with the form shown in Fig. 6 and flattened to its locking position.

Referring to the drawings, a bolt 10 and nut 11 are shown as equipped with a locking device embodying one form of the present invention, the latter including a locking element 12 for cooperation with certain special nut and bolt constructions.

The nut 11 may be any internally threaded member for cooperation with the threaded shank of the bolt 10, but in the present instance in order to receive the locking element 12 its outer face is provided with a counterbore 13 which extends an appreciable distance into the thickness of the nut.

In order that the locking element 12 can be removably mounted on the shank of the bolt 10 but held there against relative turning movement, the shank is provided with one or more axially arranged grooves 14 and in the present instance four such grooves are shown arranged at ninety degree intervals. The locking element 12 is centrally bored to slide freely over the threaded shank of the bolt 10 and is provided with tongues 15 which correspond in number and position with the grooves 14 so that the element 12 can be readily slipped over and moved axially of the shank of the bolt. The arrangement is such that when the locking element 12 is upon the shank with its tongues 15 seated in the grooves 14 there can be no possible turning movement of the element upon the shank. In this connection it should also be noticed that the element 12 is of concavo-convex contour while its thickness is such as to allow it to flex readily and be forced to assume a flat position when it is functioning in its operative position.

In order to interlock the locking element 12 with the nut 11 the wall bounding the counterbore is provided with one or more radial holes 16 which are arranged respectively to receive one or more tongues 17 of the locking element 12. In this instance four holes 16 are provided in the nut and four tongues 17 provided on the locking element 12, and the respective tongues and grooves are circumferentially spaced a like distance so that each tongue will enter one of the holes when the locking element 12 is forced to a flat position. Normally the overall diameter of the locking element 12 is slightly less than the internal diameter of the counterbore 13 and hence in assembling the device the element 12 can be freely slipped over the end of the bolt shank and moved into the counterbore of the nut where it automatically takes the position with the tongues opposite the holes 16 by reason of the location of the grooves 14 and tongues 15.

When the parts are assembled in unlocked position as shown in Figure 2 the nut 11 can be freely rotated or turned upon the shank of the bolt 10 until it is brought to rigid clamping position upon the parts held by the bolt and it can then be locked in this position by the employment of any suitable tool engaging the convex face of the locking element 12 and forcing the latter to expand into a flat position where the tongues 17 enter the holes 16 of the nut. This effectually locks the nut against movement and it is so held until it is desired to remove it which can easily be done by inserting a suitable implement back of the locking element 12 and prying it out of position.

In the form of the invention shown in Figs. 6 and 7, the counterbore 18 of the nut 20 has its encircling wall formed with a plurality of radially disposed bevelled openings 21 spaced at relatively small angular degrees apart for the reception of tongues 22 respectively. The bevelling of the openings 21 is such that the diameter of the bottom of the counterbore is somewhat greater than the diameter at the entrance to the counterbore. These tongues 22 are formed as the periphery of a washer 23 which has an axial opening 24 of a diameter to slide readily over the bolt threads and yet is prevented from relative turning upon the bolt by reason of inwardly disposed tongues 25 respectively entering the grooves 14 of the bolt 10. The tongues 22 are bevelled complementary to the openings 21 so that when the curved washer 23 is flattened to locking position it cannot be improperly displaced. In assembling this modified form of the invention the nut 20 is brought to its tight position on the bolt 10, and the washer 23 is then slipped over the end of the bolt with its tongues 25 sliding in the grooves 14 until it seats in the counterbore 18 with the tongues 22 respectively in the openings 21. The nut 20 is now rigidly held against turning relative to the bolt 10 and is locked until such time as it becomes desirous to loosen the bolt which can be done by prying the washer out to release the nut for movement.

It will now be apparent that a complete, efficient and economical lock nut has been devised whereby a nut can be tightened upon a bolt and locked fast against movement of any kind thereafter. It should be noted that the interlocking between the locking washer and the nut takes place by the interfitting of parts lying in the plane of the nut and hence there is the maximum resistance to an applied force acting to release the nut. Also the locking washer is located within a counterbore of the nut and is therefore shielded and protected from exterior adjacent moving parts which otherwise might dislodge the washer and thus inadvertently release the nut.

While but two forms of the present invention are shown, it is to be understood that the invention is not limited to any specific construction, but might be applied to various forms without departing from the spirit of the invention or the scope of the appended claims.

Having thus described my invention, I claim:

1. In a lock nut construction the combination of a bolt provided with a groove, a nut arranged to thread on said bolt and having a counterbore and a radial hole opening into said bore, and a curved washer slidable over the threads of said bolt having an inwardly disposed tongue to seat in said groove and an outwardly disposed tongue to enter said radial hole when said washer is pressed flat in said counterbore.

2. In a lock nut construction the combination of a bolt provided with a plurality of axially disposed grooves, a nut for said bolt having a counterbore and a plurality of radially arranged openings communicating with said bore, and a curved washer slidable over the threads of said bolt having a plurality of inwardly disposed tongues for respectively entering said grooves and a plurality of outwardly disposed tongues to respectively enter said radial openings when said washer is pressed flat within said counterbore.

3. In a lock nut construction the combination of a bolt, a nut arranged to thread on said bolt and having a counterbore and a radial hole opening into said counterbore, a flexible washer slidable over the threads of said bolt having an outwardly disposed tongue to enter said radial hole where said washer is pressed flat in said counterbore, and means for preventing relative turning movement of said washer with respect to said bolt.

Signed at Philadelphia, county of Philadelphia, State of Pennsylvania, this 4th day of April, 1929.

GEORGE I. BOLES.